UNITED STATES PATENT OFFICE.

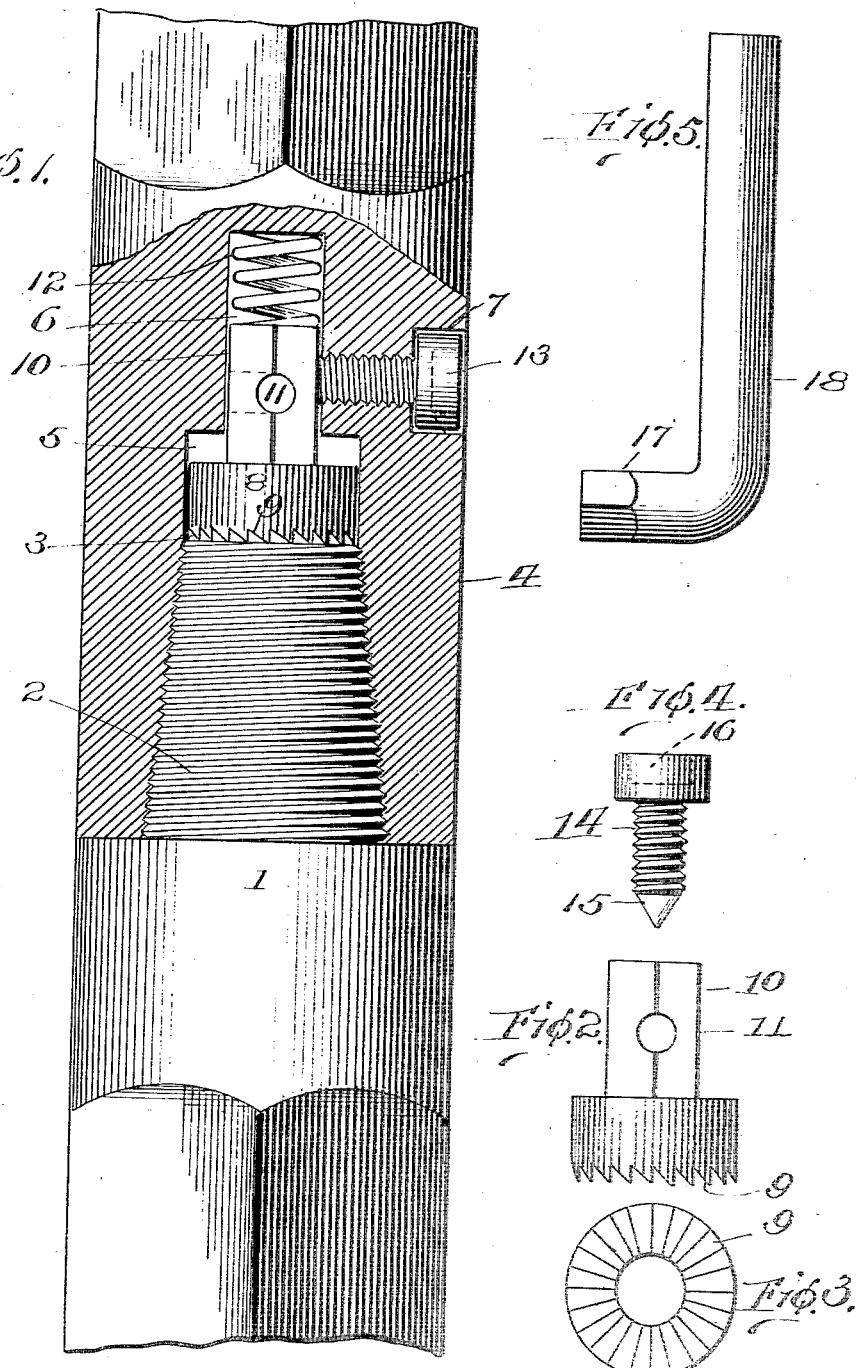

ALLIN B. OWEN AND JOHN S. SNYDER, OF LAWRENCEVILLE, ILLINOIS.

SCREW-JOINT.

1,067,878.  Specification of Letters Patent.  Patented July 22, 1913.

Application filed December 19, 1912. Serial No. 737,695.

*To all whom it may concern:*

Be it known that we, ALLIN B. OWEN and JOHN S. SNYDER, citizens of the United States, residing at Lawrenceville, in the county of Lawrence and State of Illinois, have invented certain new and useful Improvements in Screw-Joints, of which the following is a specification.

This invention relates to screw joints, and it relates particularly to means for locking together the parts of such joints.

The object of the invention is to provide a joint or coupling of such construction that a rigid close connection between the parts joined shall be furnished thereby preventing independent movement of such parts.

A further object of our invention is to provide means of such construction for locking screw joints that the parts connected shall be rigidly connected when in use; wherein accidental disconnection of the parts shall be rendered impossible; and wherein by slight manipulation the parts may be disconnected when desired.

With these objects in view the invention consists of a joint of the kind referred to having the generic and specific features of construction and arrangement of the parts substantially as hereinafter described and claimed.

In the embodiment of our invention herein shown we have illustrated a joint by which a drill is connected with a drill rod.

In the drawings, Figure 1 is a side elevation, partly in section showing the joint in position to connect a boring tool to a rod; Fig. 2 is a side view of a disk having ratchet teeth, and its shank, forming part of the means for locking the joint; Fig. 3 is an inverted plan view of the disk; Fig. 4 is a view showing a screw plug of a form adapting it for use in disconnecting the joint; and, Fig. 5 is a side view of a wrench for use in introducing and removing the detachable parts of the joint.

In this drawing 1 represents the upper end of a drill pin which has extending therefrom a taper externally screw-threaded pin or projection 2, the upper end of which pin or projection has formed thereon a series of ratchet teeth 3 adapted, in connection with means hereinafter to be described, to prevent the unintentional turning of the pin to unscrew it from the box in the direction to remove it from an opening into which it is introduced.

4 represents an end of a drill box which is provided with a conical opening having screw-threaded sides, the opening and the screw threads corresponding in size and shape to those of the portion 2 of the drill pin. The drill rod is provided above the conical screw-threaded opening thereof with a circular recess 5, and communicating with and extending from such recess is an opening 6 smaller in size than the opening 5 and which is square or angular in cross section. Extending from the outer wall of the drill rod 4 at a point in line with the square opening 6 is a passage 7 the inner portion of which is screw-threaded, and the outer portion of which is enlarged as shown in Fig. 1 of the drawing.

8 represents a block or disk having on one face thereof a series of teeth 9 which correspond in shape and size to those formed on the upper end of the portion 2 of the drill tool. Projecting from the face of the disk or block 8 opposite to that on which the teeth 9 are located is a shank 10 square or angular in cross section, and adapted to fit closely into the opening 6 in the end of the drill rod in a manner to prevent turning of the shank in the opening, the shank being free to move longitudinally in the opening. The shank 10 has extending through it two intersecting openings or passages 11 to receive means for holding the disk 8 during the formation of a joint and for moving it in the act of disconnecting the parts of a joint. Located in the angular opening 6, when the parts of the device are assembled, and bearing on the upper end of the shank 10, is a coil spring 12.

13 represents a set screw adapted to be introduced through the opening 7 in the side of the drill rod box and which is adapted to close the opening and prevent entrance of water and foreign matter when the parts of the joint are in position to secure the boring tool and the rod together. 14 represents a screw also adapted to be introduced into the opening 7 and which is provided with a taper end 15. Both the screws 13 and 14 have enlarged ends with square countersinks 16 therein for the reception of the end 17 of the wrench 18 which is used in introducing and removing the screws.

In assembling the parts to effect a joint the spring 12 is introduced into the upper end of the square opening 6, and the shank 10 of the disk 8 is introduced and moved into the square opening to compress the spring. The screw 14 is then placed in the opening 7 bringing the taper end thereof into one of the openings 11 in the shank, thereby maintaining the disk in the upper end of the recess in the box, such recess being of a length in excess of the thickness of the disk. The shank of the drill is then screwed into the opening in the lower end of the drill rod until seated, at which time the ratchet teeth on the end of the shank will project into the recess 5. When the parts have been placed in this position the screw 14 is removed allowing the spring 12 to force the disk toward the drill tool, bringing the respective parts into locking engagement and thereby preventing the rotation of the tool, thus assuring the permanent connection of the parts so long as the connecting means remain in the position assumed. The screw 13 is then introduced into the opening 7 forming a closure which prevents the entrance of any matter which might tend to interfere with the working of the means for locking the joint.

To disconnect the parts the screw 13 is removed and the screw 14 is inserted in place thereof, and the taper end of the screw 14 is forced into one of the openings 11, which openings when the parts are in locked position are slightly below the passage 7, thereby raising the disk and bringing the teeth thereof out of engagement with those on the pin or projection of the tool. The raising of the disk in this way allows the unscrewing of the pin from the drill box.

The joint formed as described insures the connection of the parts in a manner which will prevent any independent movements of the tool and the drill rod. As will be seen the pin or projection of the tool may be firmly seated in the opening in the rod forming practically an integral part thereof, and may be locked by the toothed disk in this position. Therefore injury to the tool in the nature of crystallizing or otherwise by reasons of impacts of the rod on the tool when in use is avoided, and pin cannot be lost by becoming unscrewed.

We claim:—

1. A joint of the kind described comprising one member having an internally screw-threaded opening, a recess adjacent to such opening and communicating therewith, and an angular opening extending from the recess, a disk or block located in the recess and having ratchet teeth on one face thereof and an angular stem extending from the opposite face and projecting into the angular opening, a spring bearing on the end of the stem, and a second member having a screw-threaded pin or extension provided on its end with teeth corresponding to those on the disk.

2. A joint of the kind described comprising one member having an internally screw-threaded opening, a recess adjacent to such opening and communicating therewith, an angular opening extending from the recess, and a passage extending from the outer face of the member to the angular opening, a disk or block located in the recess and having ratchet teeth on one face thereof and an angular stem extending from the opposite face and projecting into the angular opening, a spring bearing on the end of the projection, a screw extending through the passage, and a second member having a screw-threaded pin or extension provided on its end with teeth corresponding to those on the disk.

3. A joint of the kind described comprising one member having an internally screw-threaded opening, a recess adjacent to such opening and communicating therewith, an angular opening extending from the recess and a passage extending from the outer face of the member to the angular opening, a disk or block located in the recess and having ratchet teeth on one face thereof and an angular stem having openings therethrough extending from the opposite face and projecting into the angular opening, a spring bearing on the end of the projection, and a screw having a taper end adapted to be introduced into the passage and have its taper end enter an opening in the angular stem, and a second member having a screw-threaded pin or extension provided on its end with teeth corresponding to those on the disk.

In testimony whereof we have affixed our signatures in presence of two witnesses.

ALLIN B. OWEN.
JOHN S. SNYDER

Witnesses:
HENRY C. JOHNSON,
GEORGE W. LACKEY.